UNITED STATES PATENT OFFICE.

WALLACE ALEXANDER, OF JERSEY CITY, NEW JERSEY, ASSIGNOR TO THE DE LAVAL SEPARATOR COMPANY, OF NEW YORK, N. Y., A CORPORATION OF NEW JERSEY.

PROCESS OF SEPARATING BUTTER-OIL FROM MILK, SKIM-MILK, CREAM, BUTTER-MILK, BUTTER, &c.

1,401,853.     Specification of Letters Patent.     Patented Dec. 27, 1921.

No Drawing.     Application filed December 15, 1919. Serial No. 345,128.

*To all whom it may concern:*

Be it known that I, WALLACE ALEXANDER, a citizen of the United States, residing at Jersey City, county of Hudson, and State of New Jersey, have invented a new and useful Improvement in Processes of Separating Butter-Oil from Milk, Skim-Milk, Cream, Buttermilk, Butter, &c., of which the following is a full, clear, and exact description.

It is known that the richest cream contains less than 30 per cent. of butter fat, ordinary cream of high quality containing about 12 per cent. To obtain butter oil, which may be defined to be cream approximating 100 per cent. butter fat, is extremely difficult and has not heretofore been obtained by a commercially practicable process or by any process which effects an approximately quantitative recovery of the butter fat.

The object of my invention is to approximately quantitatively recover the butter fat from cream, either sweet or sour, butter, either fresh or rancid, milk, skim milk, or butter-milk, and obtain the butter fat in the form of a butter oil which will be substantially 100 per cent. butter fat and to effect this result by a simple, inexpensive and commercially practicable process. As applied to butter, its greatest field of usefulness is the reclamation of butter oil from butter, which has become so stale that it is disagreeable to the taste. As is well known, the more or less rancid flavor of the butter is due, not to the deterioration of the butter fat, but to the deterioration of the other constituents of the butter, particularly the casein. The removal of these constituents permits of the manufacture of the highest grade butter, milk or cream from the butter oil or of the utilization of the butter oil in the manufacture of ice cream and other milk products.

The percentage of butter fat in the various products mentioned will vary within a very wide range. Thus, in skim milk and in butter-milk, the percentage of butter fat will be but a fraction of one per cent., while in butter it will be as high as 84 per cent. My process, however, is carried out in essentially the same way, whatever the material treated.

My process comprises first adding more or less water to the material. If butter is to be reclaimed, I add from 10 to 20 per cent. water, or even a larger percentage. If skim milk or butter-milk is to be treated, little or no water need be added.

The material is then introduced into an autoclave and subjected to heat sufficient to develop a low steam pressure. The length of time required will, in the treatment of any given material, vary with the steam pressure. The lower the pressure, the more time will be required. Thus, a temperature as low as ten pounds to the square inch, corresponding to a temperature of 240° F., is feasible and will require about an hour's time. However, in order to facilitate the process, a pressure of twenty to twenty-five pounds is preferred. The minimum workable pressure is about five pounds, corresponding to a temperature of about 227° F., and at this low temperature the process will be somewhat prolonged. Any pressure lower than this, that is, any temperature corresponding to about the boiling point of water, will not be sufficiently high to dissolve the curds or casein, which will not go into solution, but will be precipitated, and the butter fat contained therein or agglomerated therewith cannot be recovered. It may therefore be stated that the material must be heated under pressure to a temperature and for a time sufficient to dissolve the casein. It is the decayed casein in the original material that produces the objectionable odor. By dissolving the casein in the water, it is removed when the water, in the next step, is separated from the oil.

Upon removal of pressure from the autoclave, and upon allowing settlement, the butter oil will rise to the top. Gravity alone may be depended upon to effect separation, and a very good separation may be thus obtained. Care, however, must be taken to give sufficient time for the elimination of any neutral zone of oil and water. The process of separation may be expedited, and a thorough separation of the oil from the water and other ingredients may be insured, by subjecting the mixture to the action of centrifugal force. It is not, however, practicable to effect the separation by running the mixture through an ordinary cream separator. I have found, however, that by subjecting it to the action of centrifugal force in a special centrifugal separator, and particularly the separator of the Snyder Patent No. 1,283,343, dated October 29, 1918 (which is especially adapted for use in the separation of dirty water from gasolene or mineral oil), the oil will be cleanly separated from the water and will consist of nearly 100 per cent. butter fat.

It will be understood that this process does not put the butter fat in such condition that it will "keep" for any substantial length of time. My process is not intended or adapted for that purpose, the object being merely to secure an approximately quantitative recovery of butter fat. In view of the high price that butter fat commands, the loss of even a small percentage of the butter fat is a serious loss. Moreover, my process is more economical from another aspect, in that it is simple, inexpensive and expeditious. If it is desired to preserve the butter oil it may be dehydrated to remove the fraction of one per cent. of water that it still contains or may be otherwise treated. Ordinarily, however, it will be desirable and practicable to immediately work it up into the product that it is desired to produce.

The process is not limited in its application to obtaining butter oil from the ingredients herein mentioned. For example, it is applicable to the treatment of emulsions of oil and albumen such as are obtained in the practice of the process set forth in applicant's pending application Serial No. 298,796, filed May 21, 1919.

Having now fully described my invention, what I claim and desire to protect by Letters Patent is:

The process of recovering butter fat from butter fat-containing materials which comprises heating such material under pressure to a temperature corresponding to low steam pressure and sufficient to dissolve the casein contained in the material and afterward separating the butter fat from the water.

In testimony of which invention, I have hereunto set my hand, at New York, on this 12th day of December, 1919.

WALLACE ALEXANDER.